Patented Oct. 5, 1948

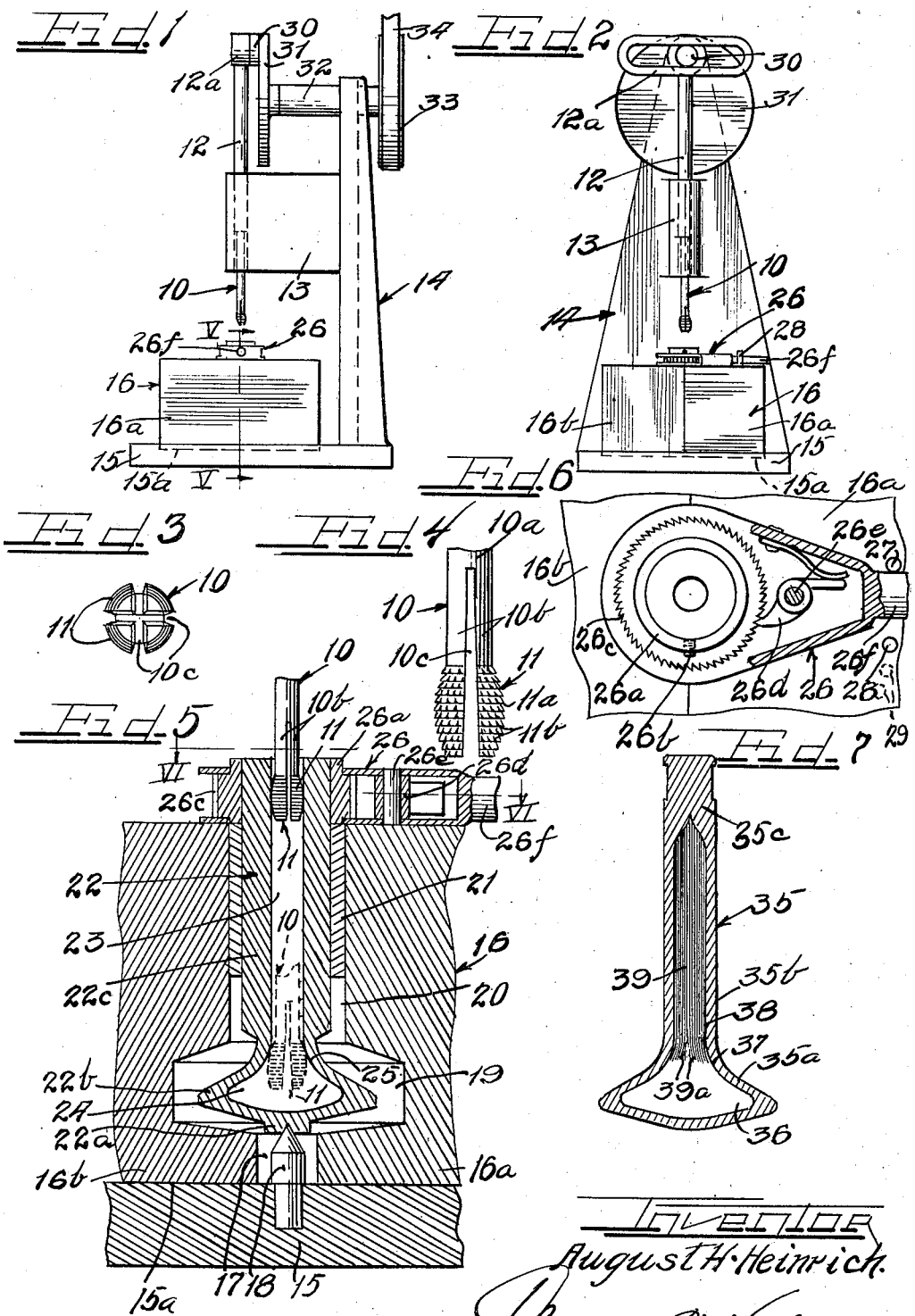

2,450,797

UNITED STATES PATENT OFFICE 2,450,797

APPARATUS FOR REMOVAL OF ANNULAR SCRATCHES

August H. Heinrich, Euclid, Ohio, assignor to Thompson Products, Inc., a corporation of Ohio Application March 17, 1944, Serial No. 526,996

2 Claims. (Cl. 29—76)

This invention relates to the changing of the direction of scratch marks in highly stressed machined parts to reduce the danger of breakage of the parts.

Specifically the invention deals with the removal or destruction of annular scratches in hollow stemmed articles such as hollow poppet valves so that loci for annular fatigue cracks are eliminated.

Breakage of high stressed machined parts occurs at, and may actually be caused by, minute machining marks. In machining tubular parts, such marks may be caused by drilling, boring, reaming, grinding or other operations. If such operations are carried out by relative rotation between the parts and the operating tool, the tool marks will be at right angles to the axis of the parts and will extend circumferentially of the parts. It is very difficult to completely remove the annular tool marks or scratches by polishing.

This invention deals with changing the direction of tool marks or scratches in machined parts so that the marks or scratches extend parallel to the axis of the parts thereby reducing the danger of breakage of parts that are subjected to axial load.

The invention will hereinafter be specifically described in connection with the filing of interiors of hollow poppet valve stems but it should be understood that the invention is not limited for use on any specific metal article since it is generally applicable to the filing of metal and especially interior metal surfaces to finish these surfaces.

In the production of hollow poppet valves, austenitic steels are used which tear quite easily, and reaming, drilling, and grinding operations leave annular tool marks in the surface of the steel. The presence of such annular marks in the finished valve is quite dangerous since any annular scratch, no matter how minute, might form a fatigue locus during use of the valve, resulting in valve failure. Since the poppet valve stem, in operation, is subjected mainly to tensile stresses, these annular or circumferential scratches are especially dangerous and, according to this invention, are replaced with or broken up by axial scratches extending parallel to the axis of the valve stem.

Hollow poppet valves are partially filled with coolant, such as sodium, for dissipating heat from the head of the valve down through the length of the valve stem and, since rapid heat transfer is especially desirable to maintain the valve head as cool as possible in operation, the valves are made with relatively thin walls. These thin walls must carry heavy axial stress loads and shocks since the valve is subjected to repeated pounding as it opens and closes in an engine. It is, therefore, quite obvious that the stem part of the valve must be made fatigue resisting as possible to successfully resist all strains to which it is subjected.

The present invention provides for the finishing of the hole or inside wall in a valve stem by holding the valve in a vertical position and by reciprocating a device carrying a split file to move the file in the hole parallel to the axis thereof thereby finishing the hole by a filing operation. Neither the reciprocating device nor the valve can have rotative movements during the filing operation but, in order to file the entire inside surface of the valve stem according to this invention, the valve is equipped with a ratchet-type circumferential feed to rotate the valve step by step between filing strokes when the file is out of engagement with the stem wall.

A feature of the invention includes the provision of a tool with a bulbous filing head composed of a plurality of normally spaced segments on spring fingers adapted to be resiliently deflected to permit contraction of the head for insertion under tension in the bore of a valve stem to act on the inside wall of the stem. The tool has crossed slots dividing the burr head into four segments. The tool produces a finished surface on said wall and the contracted head of the tool can expand if moved into the valve head cavity for acting on the wall of the valve throat which wall flares out from the stem wall.

It is, then, an object of the invention to provide a file with a resiliently contractible burr head.

Another object of the invention is to provide a machine for increasing the fatigue resistance of highly stressed machine parts by changing the direction of tool marks in the parts.

A still further object of the invention is to provide an apparatus for finish-machining tubular parts, including the interior wall of parts containing blind holes, which will eliminate all circular tool marks and leave, if any, only tool marks running parallel to the axis of the parts.

Other and further objects of the invention will be apparent to those skilled in the art from the following detailed descriptions of the annexed sheet of drawings which, by way of preferred example only, illustrates one embodiment of the invention.

3

On the drawings:

Figure 1 is a side elevational view of apparatus for reciprocating a slotted file according to this invention in a hollow valve stem and equipped with a ratchet type circumferential feeder for rotating the valve between reciprocating strokes.

Figure 2 is a front elevational view of the apparatus shown in Figure 1.

Figure 3 is a plan view or end view of a slotted file or burr head according to this invention.

Figure 4 is a fragmentary side elevational view of the file or burr head of Figure 3.

Figure 5 is a vertical cross-sectional view, with parts in elevation, taken along the line V—V of Figure 1.

Figure 6 is a fragmentary top plan view with parts in horizontal cross section taken along the line VI—VI of Figure 5.

Figure 7 is an axial cross-sectional view of a finished poppet valve free from annular scratches or tool marks in the stem thereof and containing axial scratches blending into the head cavity of the valve.

As shown on the drawings:

In Figures 1 to 5 inclusive the reference numeral 10 designates generally a slotted filing tool or burr according to this invention. The tool 10 has a cylindrical shank portion 10a with four dependent resilient fingers or prongs 10b thereon separated by cross slots 10c. Each finger 10b has a bulbous end portion or burr head 11 thereon. The four burr heads cooperate to provide a resilient rounded end on the shank and the head portion defined by the four ends 11 has a plurality of annual grooves therearound providing sharp cornered shoulders 11a in spaced superimposed relation and having tapered side walls with file slots 11b therein.

As shown in Figures 1 and 2, the file tool 10 is mounted on the end of a reciprocating shaft 12 slidably carried in a bearing 13 of an apparatus 14 suitable for effecting filing of a valve stem wall with the tool 10. The apparatus 14 includes a base 15 with a recess 15a therein accommodating a split valve holder 16. As shown in Figure 5, the holder 16 includes two blocks 16a and 16b, cooperating to define therebetween an open bottomed chamber 17, receiving a pivot pin 18 mounted on the base 15, an enlarged chamber 19, a smaller cylindrical chamber 20 projecting from the top of the chamber 19 to the top of the block, and a split liner 21 in the chamber 19.

A valve blank 22 has a lug 22a on the head 22b thereof receiving the pointed end of the pin 18 when the head 22b is disposed in the chamber 19. The blank has a stem 22c extending through the chamber and rotatably mounted in the sleeve 21. The valve stem 22c has a straight cylindrical bore 23 extending from the tip end of the stem into the valve head cavity 24. The bore 23 flares out into the head cavity 24 as at 25.

The holders 16a and 16b, when seated in the recess 15a of the base, cooperate to support the valve 22 in upright vertical position with the head 22b, thereof rotatably carried on the pin 18 of the base.

Any suitable circumferential feeding device for rotating the valve 22 to a predetermined or indexed amount can be provided. In Figures 1, 2, 5 and 6 a simple ratchet wrench 26 has been illustrated as a suitable circumferential feed device for the valve. This ratchet wrench 26 is of known construction and has a rotary head 26a receiving the upper end of the valve stem 22c therethrough. A locking pin 26b can be threaded through the head 26a for clamping the cylindrical stem in the head. A ratchet 26c is provided around the head 26a and the teeth of this ratchet cooperate with a pawl 26d carried on a pin 26e in the housing of the wrench. The ratchet 26c is provided with a handle 26f extending laterally from the rotary head 26a thereof. The wrench 26 can rest on top of the holder blocks 16a and 16b and the handle 26f thereof can project over the top face of the holder block 16a between a stop pin 27 and an indexing pin 28 as best shown in Figure 6. This block 16a can be provided with a plurality of spaced holes 29 for receiving the indexing pin 28. Manual pulling of the handle 26f from the stop pin 27 to the indexing pin 28 will cause rotation of the valve 22 in the holder 16 a predetermined number of degrees, depending upon the selected position for the indexing pin. Of course the handle 26f will be moved back against the stop pin 27 without rotating the valve since the pawl 26d will only slip over the teeth of the ratchet 26c. The ratchet wrench merely provides a convenient indexed circumferential feed device for rotating the valve a predetermined number of degrees between filing strokes, as will hereinafer be more fully described.

The filing tool or burr 10, as explained hereinabove, is secured in the lower end of the shaft 12. The upper end of this shaft has an elongated eye end or cross head 12a thereon slidably receiving a driving pin 30 on a disk 31 carried on a jack shaft 32 by the stand of the apparatus 14 and rotated by means of a pulley 33 from a belt 34. Rotation of the disk 31 causes reciprocation of the shaft 12 and tool 10 on the end thereof, moving the tool from spaced relation above the top of the valve 22 as shown in Figures 1 and 2 into and through the bore 23 of the valve and throat 25 of the valve to the dotted line position shown in Figure 5. The burr heads 11 of the file tool, in their free state, are arranged so that their lower ends will freely enter the bore 23 but, as explained above, the burr heads are of bulbous form and present, in their free state, an intermediate area which is of larger diameter than the bore 23. Therefore, the burr heads are depressed toward each other decreasing the widths of the cross slots 10c and flexing the fingers 10b. The fingers, being resilient, are then maintained under tension and are effective to urge the burr heads radially outward to reclaim the original widths of the cross slots 10c. As a result, the file has a tendency to expand and has some bearing around the entire bore 23. This produces a more highly polished surface in the bore 23.

As the tool 10 approaches the lower end of its stroke, the burr heads 11 enter the head cavity 24, which is larger in diameter than the bore 23, and the tool expands so that the heads will actually remain in engagement with the outwardly flaring throat wall 25 to file this wall. In order to present all of the inside surface of the bore 23 of the valve blank 22 to the burr head to produce a smooth circular surface free from annular tool marks, the valve is rotated between strokes of the tool 10 by the ratchet wrench 26 only when the burr heads 11 are out of engagement with the valve blank so that this rotation will not cause annular scratching of the valve blank. The amount of rotation between filing strokes can be varied as desired to produce the desired finish in the valve.

As shown in Figure 7, a finished valve 35 is produced from the blank 22, and this valve has a hollow head 35a, a hollow cylindrical stem 35b.

and a closed tip end 35c on the stem. The head has an enlarged cavity 36, a throat 37 converging from the cavity 36 to the cylindrical bore 38 in the stem 35b.

In accordance with this invention, straight axial scratches 39 extend throughout the length of the stem bore 38 in spaced parallel relation, and have outwardly flaring ends 39a in the throat 37 following the contour of the throat but still in axial spaced parallel relation. The valve stem bore 38 and the throat 37 are free from any annular or circumferentially extending scratches, and any such scratches that occurred in the original blank from which the valve 35 was prepared have either been completely obliterated or have had superimposed on them numerous scratches substantially parallel to the valve axis and deeper than the original annular scratches so as to cut these annular scratches into very short length increments.

From the above descriptions it will be understood that the invention now provides an apparatus in the form of a slotted filing tool having resilient springiness and a tendency to expand when inserted in a bore of a machined part to file the part, and also provides a method of reducing the danger of breakage in machined parts by removing annular or circumferential scratches.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. Apparatus for file finishing a hollow poppet valve which comprises a holder for rotatably supporting a hollow valve blank in vertical position, a reciprocal file carriage, a file carried thereby having a plurality of resilient fingers, each of which has a bulbous end substantially covered with file teeth and a device for rotating said valve blank in said holder.

2. Apparatus for file-finishing a hollow poppet valve which comprises a holder for rotatably supporting a hollow valve blank, a reciprocal file carriage, a file carried by said carriage having a plurality of resilient fingers, each of which has a bulbous end substantially covered with file teeth, and adapted to enter the interior of the valve blank to act on the stem cavity-defining wall thereof, means guiding said carriage for directing the file into the valve blank, means for rotating said valve blank in said holder, and means cooperating with said blank rotating means for limiting the extent of rotation of the blank by said blank rotating means.

AUGUST H. HEINRICH.

REFERENCES CITED

The following references are of record in the file of this patent:

UNITED STATES PATENTS

| Number | Name | Date |
|---|---|---|
| 532,819 | Riddell | Jan. 22, 1895 |
| 690,393 | Bishop | Jan. 7, 1902 |
| 1,426,552 | Cross | Aug. 22, 1922 |
| 1,434,082 | Bossert | Oct. 31, 1922 |
| 2,106,217 | Johnson | Jan. 25, 1938 |
| 2,115,461 | Hartmann | Apr. 26, 1938 |
| 2,189,659 | Arutunoff | Feb. 6, 1940 |
| 2,277,997 | Silva | Mar. 31, 1942 |
| 2,313,442 | Kline | Mar. 9, 1943 |

FOREIGN PATENTS

| Number | Country | Date |
|---|---|---|
| 3,921 | Great Britain | Feb. 15, 1913 |
| 175,606 | Germany | Oct. 19, 1906 |

OTHER REFERENCES

Publication: S. A. E. Journal, vol. 46, No. 4, "Modern Aircraft Valves." April 1940 page 158—123—188aa.